United States Patent [19]

Pelzig

[11] Patent Number: 4,956,404

[45] Date of Patent: Sep. 11, 1990

[54] PLASTIC COMPOSITION FOR TOYS, NOVELTY ITEMS AND ARTS AND CRAFTS

[76] Inventor: Josef Pelzig, 16011 Hart St., Van Nuys, Calif. 91406

[21] Appl. No.: 295,351

[22] Filed: Jan. 10, 1989

[51] Int. Cl.⁵ .................................................. C08L 3/02
[52] U.S. Cl. ...................................... 524/48; 524/563; 524/267
[58] Field of Search ................. 524/48, 109, 114, 267, 524/563

[56] References Cited

U.S. PATENT DOCUMENTS 3,853,797 12/1974 Peizig ...................................... 524/48
4,634,727 1/1987 Kamikaseda ........................ 524/563

FOREIGN PATENT DOCUMENTS 0589227 12/1959 Canada ................................ 524/114

OTHER PUBLICATIONS

Mellan, I., *Industrial Plasticizers*, Macmillian Co., New York, 1963, pp. 112–114.

Hawley, G., *The Condensed Chemical Dictionary* VNR Co., New York, 9th Ed., pp. 773–775.

*Primary Examiner*—Joseph L. Schofer
*Assistant Examiner*—Jeffrey T. Smith
*Attorney, Agent, or Firm*—Donald Diamond

[57] ABSTRACT

A composition comprising a polyvinyl acetate homopolymer emulsion, glyceryl triacetate, silicon, epoxidized oil, talc, fumed silica and dextrin exhibiting remarkable molding, coloring and printing properties for used as novelty items, activity toys and molding compounds. This composition is also for use as an artist's tool, transfer and printing medium, as an exercising device and for art therapy. The molded object, after exposure to air, becomes dry and will remain flexible and permanent, including fine detail and brilliant colors. The composition may contain suitable food dyes, which allows the color to be transferred from the compound to paper, canvas, fabric and wall. The color print dries instantly. Luster and pearlescent pigments brushed on the surface of the molded objects gives the appearance of cast precious metal.

23 Claims, No Drawings

PLASTIC COMPOSITION FOR TOYS, NOVELTY ITEMS AND ARTS AND CRAFTS

BACKGROUND

This invention relates to a plastic composition comprised primarily of polyvinyl acetate homopolymer emulsion.

Compounds for use as novelty items and for molding purposes are known in the art. For example, U.S. Pat. No. 3,167,440 discloses a material which utilizes a kerosene, chlorine salt and grain flour formulation. Also, another similar purpose material is disclosed in U.S. Pat. No. 3,384,498 which teaches a compound containing guar gum, an alkali metal borate and boric acid.

There are references to polyvinyl acetate emulsions which form a fluid material which, when dried, form a thin even coating with adhesive properties and which may be remoistened. U.S. Pat. No. 2,808,381 teaches a resin dextrin composition comprising a polyvinyl acetate emulsion, polyvinyl alcohol and dextrin exhibiting adhesive qualities for use in sealing envelopes. This patent teaches that the polyvinyl acetate emulsion must be dextrin compatible because dextrin incompatible polyvinyl resins coagulate when mixed with dextrin thereby making a composition unusable as a remoistening adhesive for sealing envelopes.

Existing modeling clays, in general, are nondrying, hard to work with, and mostly sticky. This reduces the ability to create permanently molded objects. Other air-drying compounds, which are mostly made from kerosene, flour, water and salt, crumble and are inflexible.

Other known molding compounds, such as Fimo (Trademark) of Europe are baked in an oven to harden.

U.S. Pat. No. 3,853,797 issued to the present applicant discloses a modeling compound which can be stretched easily. When rapidly stretched, the compound breaks in an even and straight line as if cut with a knife or scissors. The compound, although unique, has a limited play value because the molded objects become breakable after they have been air dried. The compound can pick up an image drawn with water color pens on a sheet of mat acetate and reprint this image many times over. By stretching the material, the printed image is distorted thereby creating unusual effects. Printing with this compound preferably is with glossy (chrome coated) paper.

There is a need for a plastic composition which selectively is suitable for novelty items, where molded objects become unbreakable and not brittle, and which is capable of enhanced pliability abilities.

SUMMARY

In contrast to these prior art materials, the invented composition involves primarily an emulsion of polyvinyl acetate homopolymer emulsion and in addition to other optional additives.

According to the present invention, the composition includes polyvinyl acetate homopolymer emulsion, glyceryl triester, epoxidized oil and dextrins. The glyceryl triester could selectively be glyceryl triacetate, glyceryl tripopionate, mixed triesters of glyceryl with acetic acid and propynic acid and mixtures and combinations thereof. The preferred glyceryl triester is glyceryl, triacetate. The preferred epoxidized oil is EPOXOL (Trademark).

The invented composition or compound remains elastic and flexible, such that molded objects like figurines, animals, insects, flowers remain flexible after being air dried.

Due to this, the molded objects become permanent and the colors remain bright. As a consequence, the play value and the playtime is improved.

The significance of the flexibility is that it allows for the molded object to be mounted on any round, curved, uneven or angular surface. Thus, colorful molded features can be glued around a vase or a decorative container. Dimensional figures, geometrical shapes or animal scenes can be mounted around a lamp base. With this material, the arts and crafts possibilities are increased.

An advantage of the invented composition is the ability to mold objects with fine detail. Fine lines, such as fingerprints, are imprinted before the material dries. Fingerprints can be enhanced visually by a metallic looking luster powder brushed beforehand onto the surface of the grey or brown compound. Fingerprint identification is possible.

The composition does not require heat or baking to obtain the finished product.

The molding material can be fed through an extruder-device in order to create with the appropriate dies most interesting shapes and forms. The fine detail modeling and extrusion concept is made possible due to the addition of fumed silica to the composition.

The material may find utility as a device for improving manual dexterity for persons requiring hand exercises.

The plastic composition may include inherent color transferring characteristics. The material after it is dry is capable of being colored with watercolor, acrylic paint or oil paint. The color transfer material is capable of printing on paper, canvas, fabric and wall. Also an image drawn with water color pens on a mat acetate plastic sheet, can be picked up with the compound and be repetitively reprinted on glossy paper. The material can be stretched with the picked-up image, to print distorted pictures, if desired.

Molding figures of any description, coins, sculptures and any dimensional shape, can be treated with unique luster colors: gold to silver, bronze, copper, brass and other colors and shades. The finished product can appear as cast metal.

The specific components, proportions and methods for making the invented composition are now described.

DESCRIPTION

The plastic composition consists of a polyvinyl acetate homopolymer emulsion, glycerol triacetate, silicon, epoxidized oil, talc, fumed silica and dextrin.

Ideally, the polyvinyl acetate homopolymer emulsion is a heavy milky fluid. The emulsion is composed of about 45% to 55% solids and about 45% to 55% water. The preferred polyvinyl acetate homopolymer emulsion is obtained from Borden Chemical and/or from Elixir Industries. Both companies are located in the greater Los Angeles area.

A suitable glyceryl triacetate $C_3H_5(OCOCH_3)_3$ is that produced by Eastman Chemical Products, Inc., namely KODAFLEX TRIACETIN (Trademark). The feature of such a product is that it is compatible with cellulosics, has high solvent power and low volatility. The glyceryltriacetate acts as a plasticizer and in the unique combination with the dextrin, the polyvinyl acetate homopolymer emulsion and silicone fluid permits the material to remain flexible after it is air dried.

The epoxidized oil has oxygen added to it at its chemical points of nonsaturation. The oxygen is chemically described as oxirane oxygen. The compound acts in the plasticization and heat stabilization of vinyl resins and as an acid scavenger.

This epoxidized oil product EPOXOL (Trademark) is made by American Chemical Services Inc. An epoxidized triglyceride with a high oxirane content provides the compound with additional flexibility. The luster pigments which are brushed onto the surface of a given project, adhere better and have a brighter color. The efficient scavenging of acids prevents an undesirable effect to the compound caused by a possible pH fall back.

Monsanto Chemical Co. gives the following properties for a typical polyvinyl acetate homopolymer emulsion:

| Chemicals | Grams |
| --- | --- |
| Vinyl Acetate | 740 |
| Gelvatol 20–30 (a) | 41 |
| Water | 750 |
| Hydrogen Peroxide (30% aqueous solution) | 2.42 |
| Cobalt Acetate | 0.02 |
| Formic Acid | 0.80 |
| Total | 1,534.24 |

Gelvatol 20–30 is a polyvinyl alcohol. For the new modeling and printing compound a dextrin incompatible polyvinyl acetate homopolymer emulsion is essential.

The preferred glyceryl triacetate is food grade triacetyl glycerine or TRIACETIN (Trademark). The preferred epoxidized oil is EPOXOL (Trademark).

Various other selected ingredients may be added to obtain the desired pliability and to enhance the coloring, printing and image transferring characteristics. In order to give the compound a pleasant scent, fragrance is also incorporated. After the flexible material is air dried, it will remain elastic.

A defoamer, such as silicon for removing air bubbles in the composition and reducing stickiness is useful, together with other additives to decrease tackiness. Other stabilizers, plasticizers and fillers can be used to obtain the desired composition.

It has been found that a pH of about 6.0 to 8.0 is desirable to obtain the desired physical properties. Also, certain selected chemicals are added to the compound to retard fungus and bacteria growth, and thereby act as preservatives. The invented material has been found to be nontoxic.

The glyceryltriacetate maintains the composition elastic and flexible after the material e.g. molded object is air dried. The epoxidized oil acts as an acid scavenger to the compound and also improves the adherence of the luster pigments to the surface of the molded project. The pigmented surface of the molded object thus remains shiny and colorful.

DOW CORNING (Trademark) 556 silicone fluid, cosmetic grade, is used as a defoamer to remove air bubbles from the composition. It also reduces the stickiness of the material and gives the material a better flow.

Mineral oil can be added to reduce the tackiness of the material. A suitable mineral oil is that produced by Witco Chemical Corporation, namely, Protol (Trademark). In the composition, the mineral oil serves to bind and carry other components so as to enhance the general properties.

An additional additive is a fumed silica, namely fumed silicon dioxide. This is an amorphous silicon and enables the composition to be used for molding with the finest detail. As such, the composition can be extruded into different shapes and forms. Ideally, the fumed silica is Cab-O-Sil (Trademark) produced by Cabot of Tuscola, Illinois. This product has a relatively small particle size and provides for effective control of the flow characteristics in the composition and enhances the mixing process of the compound.

Hydrogenated starch hydrolysate is added to the composition to render the product more elastic. A preferred hydrogenated starch hydrolysate is available from Lonza Inc., Fair Lawn, New Jersey under the trademark HYSTAR 7000 and was formerly available from Lonza under the trade designation POLYOL 7000. Hydrogenated starch hydrolysate controls moisture and functions as an additional plasticizer, softener and lubricant for the composition, and dissolves the granular dextrin at a faster pace in combination with water and the rest of the ingredients of the compound.

An additional product is sodium lauryl sulfate which acts as a stabilizer and helps to maintain a chemical equilibrium. The product has high foaming characteristics with extremely low salt levels, and acts to reduce the surface tension in the composition. It is part of the family of alkyl sulfates and ideally is Sipon (Trademark) obtained from Alcolac Inc. of Baltimore, Maryland.

Further additives include antimicrobial agents, for instance, a product by Dow Chemicals called DOW-ICIL 200 (Trademark). This product renders the composition suitable for repetitive use and improves the handling of the product.

Optionally, sodium hydroxide is added as a buffer to obtain an approximately neutral pH. The optimum pH would occur between 6.8 to 7.2, although the range can extend between about 6.0 and 8.0. Different organic acids can be added to control the pH characteristics of the composition. Too low a pH causes the product to lose consistency and, therefore, render it difficult to handle effectively. A pH in excess of 8.0 yields a product which is not as pliable or flexible for the desired molding, printing or handling characteristics.

An additional plasticizer which is useful is diethylene glycol. This product enhances the smoothness and plastic qualities of the composition.

In addition, other ingredients may be added to enhance or modify the properties of the composition. U.S. certified coloring agents such as food coloring and non-toxic coloring pigments may also be added.

Besides the solidifying effect of dextrin, dextrin also enables the composition to be biodegradable. The preferred dextrin is AQUA FLAKE 31 (Trademark) manufactured by National Starch and Chemical Corp. in Indianapolis, Indiana.

The various additives mentioned enhance the properties of the basic composition. Smooth and shiny surfaces can be obtained by adding sugars. Suitable preservation of the product to impart resistance bacteria growth during manufacture and give better storage to service life is through the addition of antimicrobial agents. The dry color pigments can be added to give the material the different nontransferrable colors. Perfumes and fragrances are added to give the material a pleasant scent.

Inert fillers such as talc, clay or kaolin can be added. A food grade talc makes the product more voluminous. The talc interacts with the other elements of the composition in a compatible manner which previously was not possible.

Sodium chloride can be added to stabilize against excessive heat and improves the composition immensely. Zinc in a white powder form can be added to give a white appearance to the composition and enhance the stabilization as required.

After the product is molded, luster pigments can be brushed onto the surface of the molded object and to provide a metallic effect. The luster pigments are safe, non-toxic and non-tarnishing. The Kemira Inc. of Finland and other U.S. companies manufacture these pigments. The luster and pearlescent pigments consist of titanium dioxide coated with mica platelets. Mica is the name for a group complex hydrous aluminum silicate minerals. The pigment contains transparent platelets of high refractive index. The titanium dioxide coating layer of controlled thickness on mica produces color by optical interference. The type of mica may also influence color shade of the pigment.

In an embodiment of the composition to be used as a printing composition, there is omitted from the composition fumed silica, talc and zinc. Ideally FDA food dyes are added so that the compound can be used for printing on paper, canvas, fabric and wall with excellent results.

While certain preferred additives have been specifically mentioned to obtain the properties and characteristics mentioned above, other constituents of an equivalent nature will be apparent to those skilled in the art and are considered within the teachings of this invention.

Some examples of the preferred composition of the invented material follow. The amounts recited are all in weight. Whenever additives are suggested to the basic composition, these are also suggested in weight in relation to the total of the basic composition. The approximate percentage range of each component of the composition is also set out in the following examples:

EXAMPLE 1

| Ingredients | Weight in Relation To Total Composition | Percentage in Relation To Total Composition | Possible Percentage Range in Relation To Total Composition |
|---|---|---|---|
| Polyvinyl acetate homopolymer emulsion being composed of about 45% to about 55% solids and about 45% to about 55% water. | About 200 grams | 61.4 | About 50 to about 95 |
| Glyceryl Triacetate (TRIACETIN) | About 10 grams | 3.07 | About 1 to about 6 |
| Epoxidized Oil (EPOXOL) | About 5 grams | 1.53 | About 0.5 to about 3 grams |
| Dextrin AQUAFLAKE 31) | About 8 grams | 2.4 | About 1 to about 4 |

Characteristics are improved by adding:

| Characteristics are improved by adding: | | | |
|---|---|---|---|
| Silicon fluid 556 (Cosmetic Grade) | About 10 grams | 3.07 | About 1 to about 6 |
| Mineral Oil (PROTOL) | About 10 grams | 3.07 | About 1 to about 6 |
| Zinc (white powder) | About 10 grams | 3.07 | About 1 to about 6 |
| Talc (food grade) | About 20 grams | 6.14 | About 2 to about 12 |
| Fumed Silica (CAB-O-SIL) | About 12 grams | 3.68 | About 1 to about 6 |

To further improve various characteristics, the following products are added:

| | | | |
|---|---|---|---|
| DOW-ICIL 200 (antimicrobial/antibacterial) | About 1 gram | .30 | About 0.1 to about 1 |
| Sodium Hydroxide | About 1 gram | .30 | About 0.1 to about 1 |
| Diethylene Glycol | About 5 grams | 1.53 | About 0.5 to about 3 |
| Hydrogenated Starch hydrolysate | About 5 grams | 1.53 | About 0.5 to about 3 |
| Sodium Lauryl Sulfate | About 5 grams | 1.53 | About 0.5 to about 3 |
| Fragrance | About 1 gram | .30 | About 0.1 to about 1 |
| Sodium Chloride | About 4 grams | 1.22 | About 0.5 to about 3 |

The talc is added to give the material a heavier consistency which is desirable when using the invented material to form models, sculptures, dimensional objects, jewelry. The material of Example 1 exhibits excellent molding and pliability properties. The optionally-added products improve the storage and service life of the composition. The material described exhibits the ability to be painted with acrylic, oil or water color paint.

EXAMPLE 2

The composition of Example 2 can be modified to provide a material suitable as a printing compound. In this regard, zinc, talc and fumed silica is omitted from the composition. The percentages of the constituents will change appropriately.

The composition of Example 1 can be further modified by adding 1% to 5% luster pigments. These will be applied after an object is molded and provide a metallic effect to the composition. These colors are not transferrable, namely, they are intended to color the material, or provide a lustre, but do not transfer the color to another medium when the material is placed in contact with such a medium. Similarly, other FDA-approved dry color pigments in an amount of about 1% to 15% can be added to color the material and provide an attractive appearance for molding countless different objects, and arts and crafts activity projects.

The material of Example 2 minus talc, zinc and fumed silica, has excellent utility as an artist's tool since many unusual designs, patterns and effects can be created by allowing the invented material to come into contact with a suitable surface, such as paper, painted wall, canvas or other fabrics. The color leaves the material to transfer the unusual form, created by the material, to print on a suitable surface. By stretching the material repeatedly, it takes on a free-flowing property, similar to a liquid. By allowing the material to "flow" onto a paper surface, for example, unusual color effects and color designs are created since the color leaves the invented material. The material retains a flexibility and does not harden with time or after exposure to the air, and thus remains in a semihard state. There is no brittleness in the material.

As a printing compound, for instance, FDA food dyes are added. For illustration, food coloring blue No. 1 is added to the compound. The material then is shaped into a round form approximately 5" in diameter and ¼" in thickness. Then, this flexible but firm shape of material is placed above a clear plastic stencil with cut-out lettering for example. After leaving the blue compound for several seconds and then lifting it from the stencil, a blue print appears on the paper or canvas which was placed under the stencil. The stencil is removed right after the compound is lifted. The print is dry. Multicolor prints, designs for textile, graphic backgrounds and endless expressions of art and design can be created with this new printing system. Each multicolor print becomes a mono-print and an original work of art, since the matrix is flexible and the color composition changes with each print.

The mixing procedure for the modeling and printing compound is the same, namely, by cold mixing. Mixing method is by a multi-shaft mixer-disperser-emulsifier manufactured by Myers Engineering Co. in Bell, Calif. The mixing process is accomplished by first dispersing all the liquid chemicals and gradually the powdered and granulated ingredients are added to the emulsion with lower speed. Finally, the dextrin is added. This makes the compound solidify and creates the finished product. The material is then extruded into appropriate containers.

With the addition of titaniuim dioxide of about 0.6% to about 1.0%, which gives the modeling compound a brighter white, the material can lift a printed picture from a newspaper. By stretching the picked-up image, funny looking pictures are created.

It should be understood that in addition to the specific methods of using the colored material described, many other applications will become apparent to the user. Many creative patterns and designs may be created, combining the various individual modes of use previously described.

It should be understood that while certain preferred applications, are here described, related methods and additives within the scope of the present invention will be apparent to those skilled in the art.

It is claimed:

1. A semi-solid plastic composition that is elastic and pliable and which remains flexible and does not become brittle after exposure to air and which retains fine detail of surface impressions without flow-back, consisting essentially of:
    (a) A dextrin incompatible polyvinyl acetate homopolymer emulsion in an amount from about 50 to about 95 wt.%, which coagulates in the presence of dextrin with the resulting coagulum incorporating all of the water of the emulsion to form a semi-solid plastic composition;
    (b) glyceryl triester in an amount from about 1 to about 6 wt.%;
    (c) epoxidized oil in an amount from about 0.5 to about 3.0 wt.%;
    (d) fumed silica in an amount from about 1 to about 6 wt.%;
    (e) hydrogenated starch hydrolysate in an amount from about 0.5 to about 3.0 wt.%; and
    (f) dextrin in an amount from about 1 about 4 wt.%.

2. A composition as claimed in claim 1 wherein the polyvinyl acetate homopolymer emulsion is composed of about 45% to about 55% solids and about 45% to about 55% water, the glyceryl triester is glyceryl triacetate and dextrin is a solidifier.

3. A composition as claimed in claim 2, including silicone fluid.

4. A composition as claimed in claim 3, wherein there is about 50% to about 95% polyvinyl acetate homopolymer emulsion and about 1% to about 6% glyceryl triacetate, 0.5% to about 3% epoxidized oil and about 1% to about 6% silicone fluid.

5. The composition of claim 2 including about 0.1% to about 1% antimicrobial and antibacterial agent.

6. A composition as claimed in claim 2, including a buffer to retain the pH in a range of about 6.0 to 8.0.

7. The composition of claim 2, including about 1% to about 6% mineral oil.

8. A composition as claimed in claim 7, including about 0.5% to about 3% diethylene glycol.

9. A composition as claimed in claim 7, including about 0.5% to about 3% sodium lauryl sulfate.

10. A composition as claimed in claim 7, including about 0.1% to about 1% fragrance compound.

11. A composition as claimed in claim 7, including about 0.5% to about 3% sodium chloride.

12. A composition as claimed in claim 7, including about 2% to about 12% talc.

13. A composition as claimed in claim 7, including about 1% to about 6% zinc.

14. A composition as claimed in claim 7, including the addition of food dye compositions, about to about 10%.

15. A composition as claimed in claim 7, including the addition of non-toxic dry pigment compositions, about 1% to about 10%.

16. A composition as claimed in claim 2, wherein the triacetin is selected from the group consisting of glyceryl triacetate, triacetyl glycerin, propanetriol triacetate, mixed triesters of glyceryl and mixtures and combinations thereof.

17. A composition as claimed in claim 2 including luster pigments.

18. A composition as claimed in claim 1 including whitener.

19. A semi-solid plastic composition which is elastic, pliable and flexible, suitable for molding, three dimensional painting and crafting, and having a pH of about 6.0 to 8.0 consisting essentially of:
    (a) about 50% to about 95% polyvinyl acetate homopolymer emulsion being composed of about 45% to about 55% solid and about 45% to about 55% water;
    (b) about 1% to about 6% silicone fluid;
    (c) about 1% to about 6% glyceryl triacate;
    (d) about 0.5% to about 3% epoxidized oil;
    (e) about 1% to about 6% whitener;
    (f) about 2% to about 12% inert filler material;
    (g) about 1% to about 6% fumed silica
    (h) about 1% to about 4% dextrin;
    (i) about 0.5% to about 3% hydrogenated starch hydrolysate; and
    (j) about 0.5% to about 3% diethylene glycol.

20. A semi-solid plastic composition suitable for printing which is elastic and flexible, having a pH of about 6.0 to 8.0 and consisting essentially of:

(a) about 50% to about 95% polyvinyl acetate emulsion;
(b) about 1% to about 6% silicone fluid;
(c) about 0.5% to about 3% epoxidized oil;
(d) about 1% to about 6% glyceryltriacetate;
(e) about 1% to about 4% dextrin;
(f) about 0.5% to about 3%, hydrogenated starch hydrolysate; and
(g) about 0.5% to about 3% diethylene glycol.

21. A semi-solid plastic composition which is elastic and pliable and remains flexible after exposure to the air consisting essentially of:
(a) Polyvinyl acetate homopolymer emulsion;
(b) Glyceryl triacetate;
(c) Epoxidized oil;
(d) hydrogenated starch hydrolysate; and
(e) Dextrin.

22. A semi-solid plastic composition which is elastic and pliable and remains flexible after exposure to the air for hand molding at about room temperature consisting essentially of:
(a) a dextrin incompatible polyvinyl acetate homopolymer emulsion in an amount from about 50 to about 95 wt.%, which coagulates in the presence of dextrin with the resulting coagulum incorporating all of the water of the emulsion to form a semi-solid plastic composition;
(b) glyceryl triester in an amount from about 1 to about 6 wt.%;
(c) epoxidized oil in an amount from about 0.5 to about 3.0 wt.%;
(d) fumed silica in an amount from about 1 to about 6 wt.%;
(e) hydrogenated starch hydrolysate in an amount from about 0.5 to about 3.0 wt.%; and
(f) dextrin in an amount from about 1 to about 4 wt.%.

23. A composition as claimed in claim 19 wherein the consistency permits hand molding at about room temperature.

* * * * *